(12) United States Patent
Schumacher (10) Patent No.: US 8,844,412 B2
(45) Date of Patent: Sep. 30, 2014

(54) MULTISPINDLE LATHE

(75) Inventor: Karl-Heinz Schumacher, Reutlingen (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 13/612,114

(22) Filed: Sep. 12, 2012

(65) Prior Publication Data

US 2013/0087027 A1 Apr. 11, 2013

Related U.S. Application Data

(63) Continuation of application No. PCT/EP2011/053223, filed on Mar. 3, 2011.

(30) Foreign Application Priority Data

Mar. 12, 2010 (DE) .......................... 10 2010 002 804

(51) Int. Cl.

| B23Q 11/12 | (2006.01) |
|---|---|
| B23B 3/30 | (2006.01) |
| B23B 9/00 | (2006.01) |
| H02K 16/00 | (2006.01) |
| B23Q 39/04 | (2006.01) |
| H02K 1/20 | (2006.01) |

(52) U.S. Cl.
CPC .............. *B23Q 11/127* (2013.01); *B23B 9/005* (2013.01); *H02K 16/00* (2013.01); *B23Q 39/044* (2013.01); *H02K 1/20* (2013.01); *B23Q 11/12* (2013.01); *Y10S 82/90* (2013.01)
USPC ............................................. 82/142; 82/900

(58) Field of Classification Search
CPC ........ B23Q 11/12; B23Q 11/10; B23Q 11/14; B23B 3/30; B23B 3/32; B23B 9/00; B23B 9/02; B23B 9/04; B23B 9/06; B23B 9/08; B23B 9/10; B23B 9/12
USPC ........................................... 82/149, 142, 900
See application file for complete search history.

(56) References Cited

U.S. PATENT DOCUMENTS

| 3,555,962 A | * | 1/1971 | Wolf et al. .................... 409/231 |
| 5,062,330 A | * | 11/1991 | Trautmann et al. ............. 82/147 |
| 5,620,646 A | | 4/1997 | Sparer et al. |

(Continued)

FOREIGN PATENT DOCUMENTS

| DE | 1 347 479 | 6/1935 |
| DE | 38 44 337 A1 | 7/1990 |

(Continued)

*Primary Examiner* — Andrea Wellington
*Assistant Examiner* — Ryan Rufo
(74) *Attorney, Agent, or Firm* — Reinhart Boerner Van Deuren P.C.

(57) ABSTRACT

Multispindle lathe comprising a machine frame (12), a spindle drum (14) which is arranged in the machine frame (12), is rotatable about a spindle drum axis (16) and is made up at least partially of segments (80) which are cut out from flat material in a stacking direction (82) parallel to the spindle drum axis (16) and extend in stacking planes (88) transverse to the stacking direction (82), these segments having receiving cutouts (90) and cooling channel cutouts (92, 96, 106) which overlap with one another such that the spindle drum (14) has spindle motor receptacles (30) for spindle motors (32) and a cooling channel system (120, 130, 180) separated therefrom by wall webs (98), characterized in that the cooling channel system has several channel subsystems (120, 130, 180) for a liquid cooling medium which are fed in parallel.

13 Claims, 8 Drawing Sheets

(56) References Cited

U.S. PATENT DOCUMENTS

| | | |
|---|---|---|
| 6,304,011 B1 | 10/2001 | Pullen et al. |
| 6,389,939 B1 * | 5/2002 | Babuder et al. ................. 82/129 |
| 6,892,735 B2 | 5/2005 | Schicke |
| 7,021,183 B2 | 4/2006 | Trautmann |
| 7,946,204 B2 * | 5/2011 | Belpanno et al. ............... 82/129 |

FOREIGN PATENT DOCUMENTS

| | | |
|---|---|---|
| DE | 10022138 A1 | 11/2001 |
| EP | 1 414 615 A1 | 5/2004 |
| EP | 1 414 615 B1 | 5/2004 |
| WO | WO 98/07227 A1 | 2/1998 |
| WO | WO 03/013781 A1 | 2/2003 |

* cited by examiner

MULTISPINDLE LATHE

CROSS-REFERENCE TO RELATED PATENT APPLICATIONS

This application is a continuation of International application No. PCT/EP2011/053223 filed on Mar. 3, 2011.

This patent application claims the benefit of International application No. PCT/EP2011/053223 of Mar. 3, 2011 and German application number 10 2010 002 804.5 of Mar. 12, 2010, the teachings and disclosure of which are hereby incorporated in their entirety by reference thereto.

BACKGROUND OF THE INVENTION

The invention relates to a multispindle lathe comprising a machine frame, a spindle drum which is arranged in the machine frame, is rotatable about a spindle drum axis and is made up at least partially of segments which are cut out from flat material in a stacking direction parallel to the spindle drum axis, extend in stacking planes transverse to the stacking direction and have receiving cutouts and cooling channel cutouts which overlap with one another such that the spindle drum has spindle motor receptacles for spindle motors and a cooling channel system separated therefrom by wall webs.

Such a multispindle lathe is known from EP 1 414 615.

In the case of the known multispindle lathe, it is, in principle, possible to cool the spindle drum but is not, however, possible to cool the spindle drum as uniformly as possible in order to avoid thermal displacements to as great an extent as possible and to discharge the heat generated by the spindle motors as optimally as possible.

SUMMARY OF THE INVENTION

This object is accomplished in accordance with the invention, in a multispindle lathe of the type described at the outset, in that the cooling channel system has several channel subsystems for a liquid cooling medium which are fed in parallel.

The advantage of the solution according to the invention is to be seen in the fact that, on the one hand, an efficient cooling of the spindle drum takes place via the cooling channel system by way of the liquid cooling medium and, on the other hand, the channel subsystems which are fed in parallel offer the possibility of adapting the cooling capacity in various areas of the spindle drum which experience heat input to various different degrees.

In this respect, it is particularly favorable when the channel subsystems cool different sections of the spindle motor receptacle which follow one another in the direction of the spindle drum axis.

It is possible, as a result of the allocation of the channel subsystems to individual, different sections of the respective spindle motor receptacle, to cool the sections which are each subject to a different heat input in a targeted manner.

In principle, it would be conceivable to nevertheless arrange the channel subsystems such that they overlap in sections.

For reasons of as simple and, therefore, inexpensive a construction as possible, it has proven to be expedient when the several channel subsystems are arranged to the side of the spindle motor receptacle in areas of the spindle drum which follow one another in the direction of the spindle axis.

In this respect, a channel subsystem is preferably provided in each of the respective areas and cools this area while the other channel subsystems are each arranged in a different area of the spindle drum and cool this area.

In principle, it would be possible to arrange the channel subsystems such that they each surround the spindle motor receptacle.

For reasons of as inexpensive and, at the same time, space-saving a construction as possible, it is, however, of advantage when the channel subsystems are arranged in intermediate spaces between spindle motor receptacles which are arranged so as to follow one another in a circumferential direction around the spindle drum axis and so the radial extension of the spindle drum with respect to its spindle drum axis can be kept as small as possible.

In this respect, several channel subsystems are preferably arranged in each intermediate space between two spindle receptacles so as to follow one another in the direction of the spindle drum axis.

With respect to the feeding of the channel subsystems, no further details have been given in conjunction with the preceding description of the solution according to the invention.

One advantageous solution, for example, provides for the channel subsystems to be fed with liquid cooling medium through a common annular space surrounding the spindle drum.

Such an annular space surrounding the spindle drum allows the liquid cooling medium to be supplied to the spindle drum in any rotary position in a simple manner, despite the rotatability of the spindle drum, namely to all the channel subsystems at the same time.

In this respect, it is provided, in particular, for a stationary annular space cover to engage over the annular space and to adjoin it sealingly on both sides thereof.

Furthermore, it is preferably provided for the channel subsystems to discharge the liquid cooling medium into an annular space for outflowing cooling medium which surrounds the spindle drum.

Such an annular space also has the advantage that, as a result, it is possible in a simple manner to drain off the cooling medium flowing into this annular space and collect it again.

In principle, the annular space for the outflowing cooling medium could discharge the cooling medium into those channel subsystems which also serve, at the same time, to collect the cooling medium.

It is, however, particularly favorable when the annular space for the outflowing cooling medium merges into a collecting receptacle, in which the cooling medium flowing into the annular space and thereby flowing out is collected and used again for cooling the channel subsystems.

In order to be able to adapt the cooling capacity provided by the individual channel subsystems to the heat input, it is preferably provided for the flow of cooling medium through the different channel subsystems to be coordinated by throttle elements.

In this respect, it is particularly favorable when the throttle elements are associated with exit openings of the channel subsystems.

For example, the throttle elements can be adjustable throttle elements or even throttle elements which can be controlled by a control of the multispindle lathe so that regulation of the heat discharged by the channel subsystems would be possible.

One particularly simple solution provides, however, for the throttle elements to be statically adjustable throttle elements.

With respect to the design of the stator body of the spindle motors, no further details have so far been given.

For example, the stator body could, as is normal for spindle motors thus far, be provided with a casing and arranged in the spindle motor receptacle with this casing.

One particularly favorable solution provides for the stator body to be designed as a stack of metal sheets and for the stack of metal sheets of the stator to abut directly on an inner wall of a stator receptacle of the spindle motor receptacle so that an optimum transfer of heat from the stator body to the spindle drum and, therefore, an optimum discharge of heat is ensured.

Additional features and advantages of the invention are the subject matter of the following description as well as the drawings illustrating several embodiments.

DETAILED DESCRIPTION OF THE INVENTION

Figure 1:
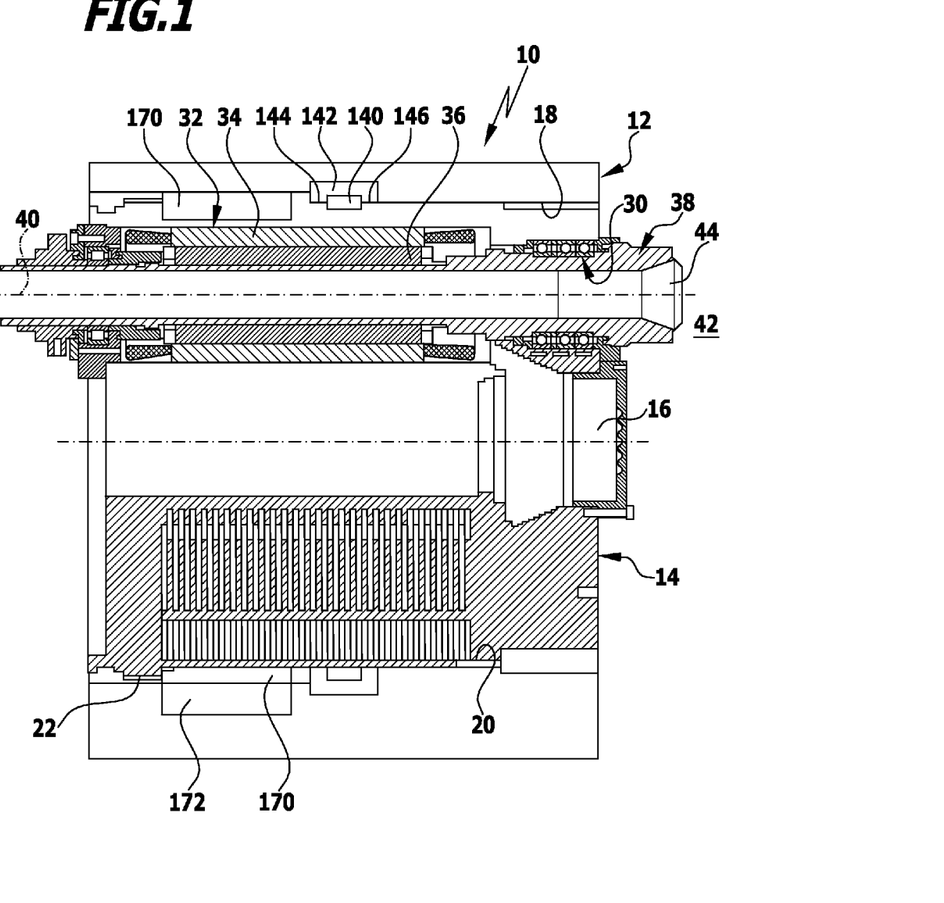
FIG. 1 shows a vertical section through a machine frame of a multispindle lathe bearing a spindle drum.

A multispindle lathe 10, which is illustrated in parts in FIG. 1, comprises a machine frame 12, in which a spindle drum designated as a whole as 14 is mounted for rotation about a spindle drum axis 16, wherein the rotatable mounting of the spindle drum 14 in a spindle drum receptacle 18 of the machine frame 12 is brought about by means of rotary bearings 20 and 22 arranged on the casing side of the spindle drum 14.

Figure 2:
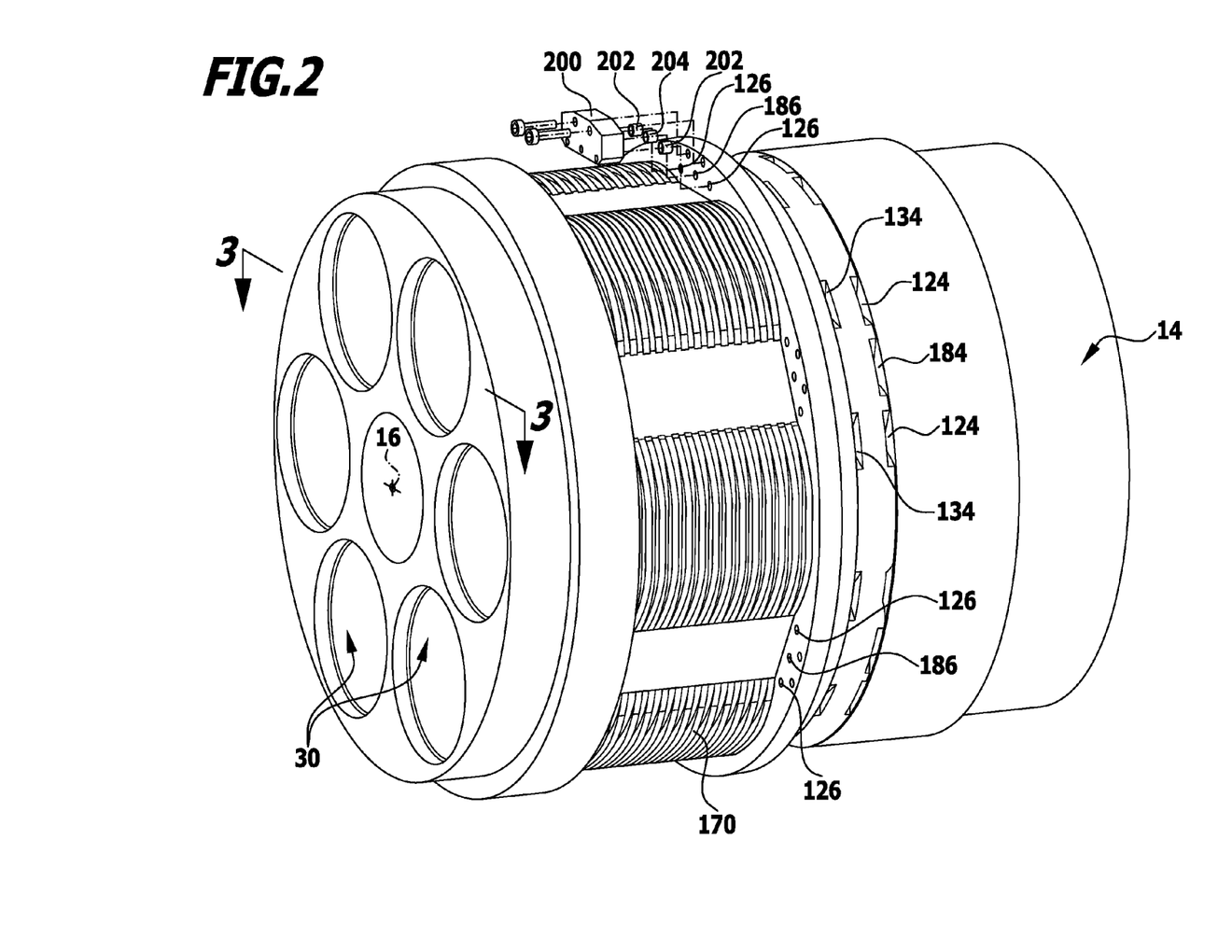
FIG. 2 shows a perspective view of the spindle drum of the multispindle lathe according to the invention.

The spindle drum 14 comprises, as illustrated in FIG. 2, a plurality of spindle motor receptacles 30 which are arranged in the spindle drum 14 around the spindle drum axis 16 and pass through it over its entire length.

A spindle motor, which is designated as a whole as 32 and designed as a hollow shaft motor, is seated in each of the spindle motor receptacles 30 and has a stator 34 which accommodates the stator coils as well as a rotor 36 which is arranged within the stator 34, is seated directly on a spindle tube 38 and is mounted by this spindle tube 38 so as to be rotatable about a spindle axis 40 relative to the stator 34. In this respect, the spindle tube 38 has, for example, on a side facing an operating space 42 a workpiece clamping device, which is not illustrated, for clamping a workpiece accommodated in the spindle tube 38 in the known manner.

Figure 3:
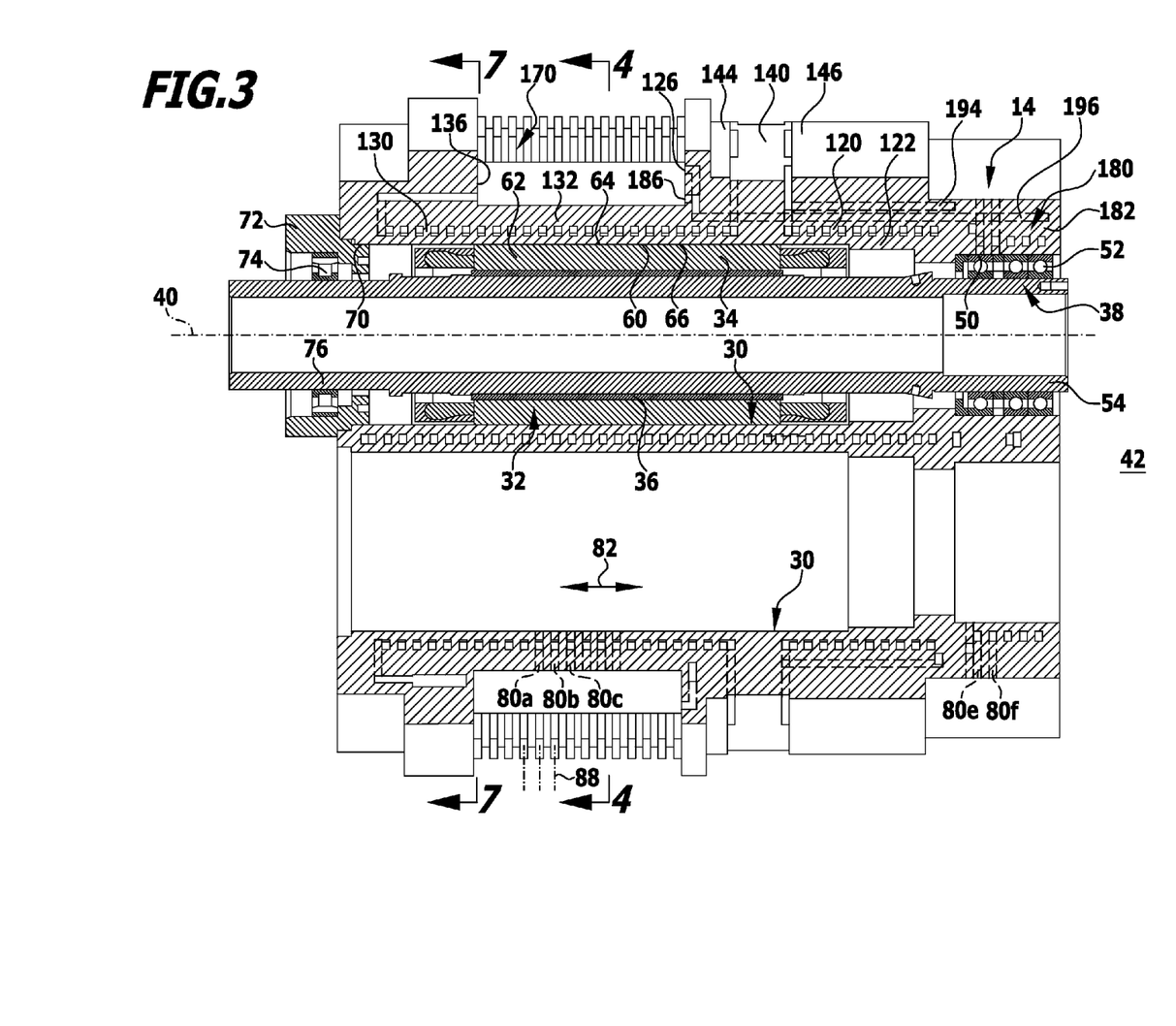
FIG. 3 shows a section along line 3-3 in FIG. 2.
Figure 4:
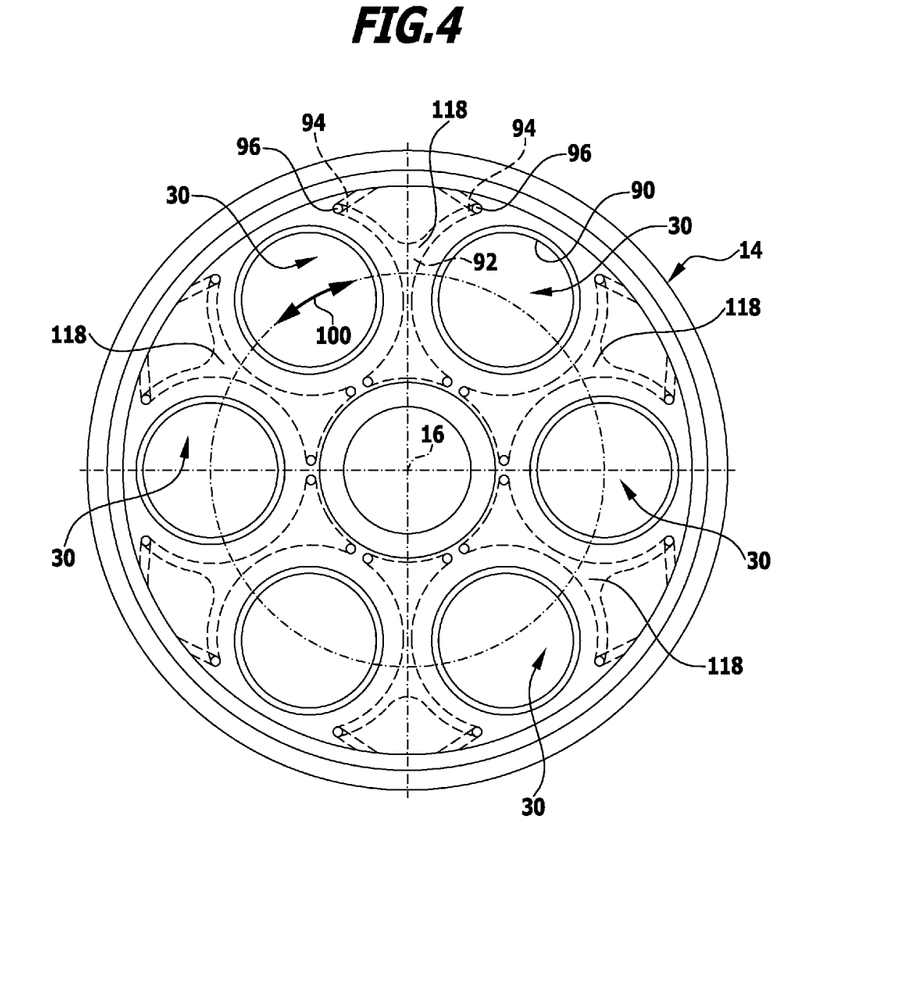
FIG. 4 shows a section along line 4-4 in FIG. 2.
Figure 5:
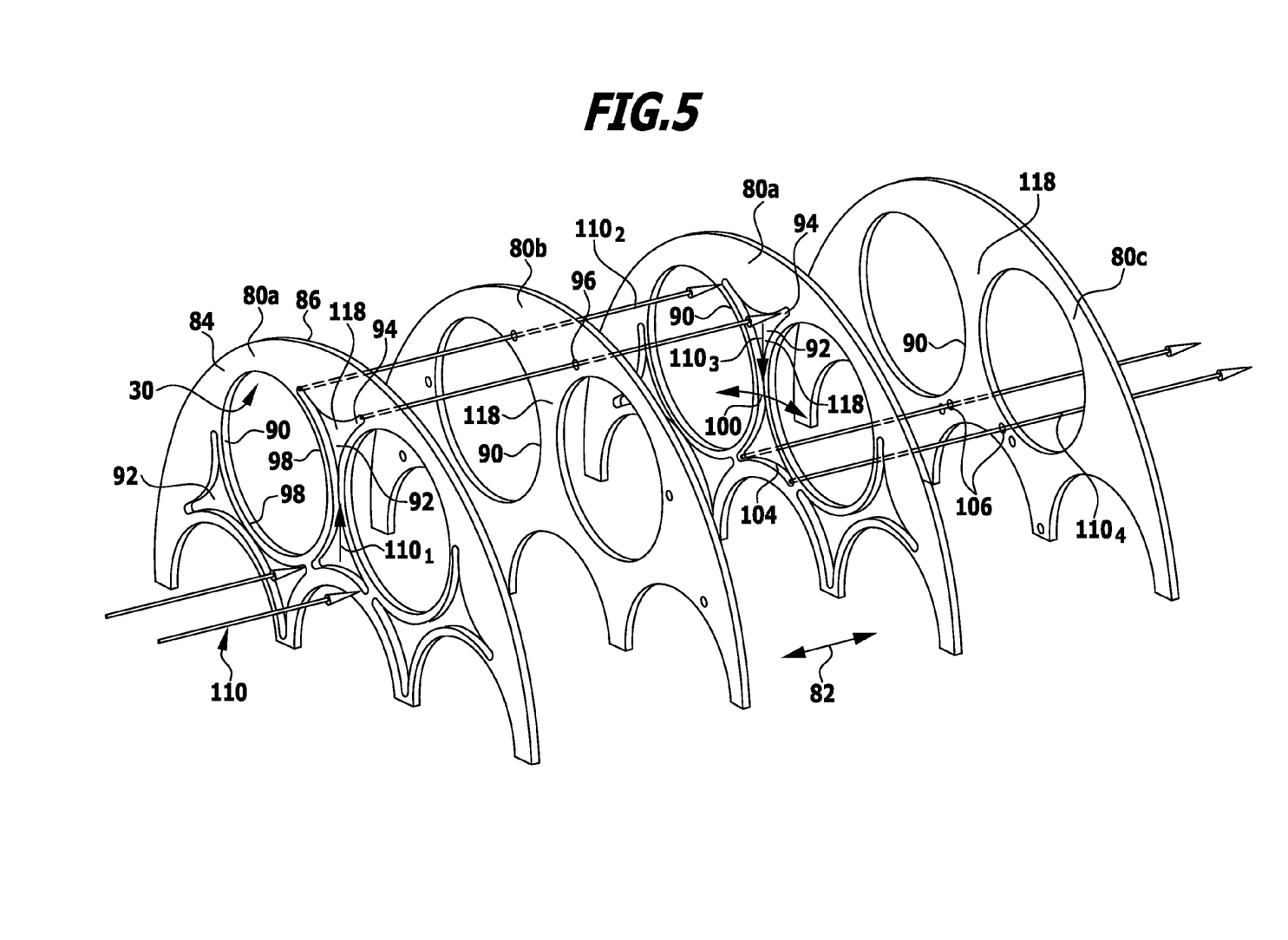
FIG. 5 shows an exploded illustration of consecutive segments with corresponding cutouts.

As illustrated, in particular, in FIG. 3 on an enlarged scale, the spindle motor receptacle 30 passing through the spindle drum 14 comprises a forward section which forms a spindle bearing receptacle 50 and in which a forward spindle bearing 52 is seated which mounts the spindle tube 38 at a forward end area 54 facing the operating space 42.

Furthermore, the spindle motor receptacle 30 comprises a section which forms a stator receptacle 60 and in which the stator 36 is seated with a stator body 62 which accommodates stator coils and is built up of stator metal sheets, wherein a casing surface 64 of the stator body 62 abuts directly on an inner wall 66 of the stator receptacle 60 of the spindle drum 14, merely, where applicable, coupled to a heat conducting mass, in order to ensure a good transfer of heat between the stator body 62 which accommodates the stator coils of the stator 36 and the spindle drum 14 in the region of the stator receptacle 60.

The spindle tube 38 is, in addition, supported on the spindle drum 14 via a rear bearing receptacle 70, wherein a bearing ring 72 engages, for example, in the rear bearing receptacle 70 and accommodates a rear spindle mounting 74 which mounts the spindle tube 38 at a rear end area 76 so as to be rotatable.

As illustrated in FIGS. 3 to 7, the spindle drum 14 is built up, at least in the region of the stator receptacle 60, from a plurality of segments 80$a$, 80$b$ and 80$c$ which are cut out from flat material, for example from steel plates, and stacked in a stacking direction 82 parallel to the spindle drum axis 16 and are connected to one another in a materially joined manner, for example by way of soldering, in particular hard soldering, to form a coherent body. The individual segments 80 preferably have plane parallel surfaces 84 and 86 and extend in stacking planes 88 which are at right angles to the stacking direction 82, as also described, for example, in the European patent application EP 1 414 615.

For the purpose of forming the spindle motor receptacle 30, the segments 80 are provided with receiving cutouts 90 which together form the spindle motor receptacle 30 in the direction of the stacking direction 82.

Furthermore, for the purpose of cooling the spindle motor receptacle 30, in particular in the region of the stator receptacle 60, cooling cutouts 92 are provided in segments 80$a$ between respective receiving cutouts 90 following one another in a circumferential direction 100 (FIGS. 4 to 7) while cooling cutouts 96 are provided in the segments 80$b$ which overlap with areas 94 of the cooling cutouts 92 located radially outwards with respect to the spindle drum axis 60 and these cooling cutouts 96 overlap in the next following segment 80$a$ with the areas 94 of the cooling cutouts 92 located radially outwards.

Furthermore, cooling cutouts 106 are provided in the segments 80$c$ which overlap with areas 104 located radially inwards with respect to the spindle drum 16 and so with a stack sequence of a segment 80$a$, a segment 80$b$, a segment 80$a$ and a segment 80$c$ as well as a following segment 80$a$ of a next stack sequence, a flow path 110 for a cooling medium results which extends in the segments 80$a$ in a direction approximately radial to the spindle drum axis 16 either with a flow path section 110$_1$ from the inside outwards or with a flow path section 110$_3$ from the outside inwards, and extends in the segment 80$b$ with a flow path section 110$_2$ and in the segment 80$c$ with a flow path section 110$_4$ approximately parallel to the spindle drum axis 16 each time so that the flow path 110, during its overall extension in the direction of the spindle drum axis 16, has sections which extend alternately in an axial direction 110$_2$ and 110$_4$ and in a radial direction 110$_1$ and 110$_3$ to the spindle drum axis 16 and these sections efficiently cool the adjoining segments 80$b$ and 80$c$ and the wall sections 98 located in the segments 80$a$ between the cutouts 90 and the cooling cutouts 92.

As a result of such a construction of the stator receptacle 60 from the segments 80$a$, 80$b$ and 80$c$ described, which are located one on top of the other in the stacking direction 82, it is possible to efficiently cool the spindle drum 14 in its wall area adjoining the stator receptacle 60 and, therefore, to efficiently discharge the heat transferred from the stator 34 to the spindle drum 14 in the region of the stator receptacle 60.

Preferably, for the purpose of cooling the stator receptacle 60, as illustrated in FIG. 3, a first channel subsystem 120 and a second channel subsystem 130 are provided which are arranged in intermediate spaces 118 located between the spindle motor receptacles 30 in circumferential direction and in areas 122 and 132 of the intermediate spaces 118 which follow one another in the direction of the spindle drum axis 16, wherein the first channel subsystem 120 is arranged in an area 122 facing the forward spindle bearing receptacle 50 and adjoining the stator receptacle 60 while the second channel subsystem 130 is provided in an area 132 facing away from the spindle bearing receptacle 50 and bordering on the stator receptacle 60.

The two channel subsystems 120 and 130 are operated in parallel with cooling medium, in particular with liquid cooling medium.

Figure 6:
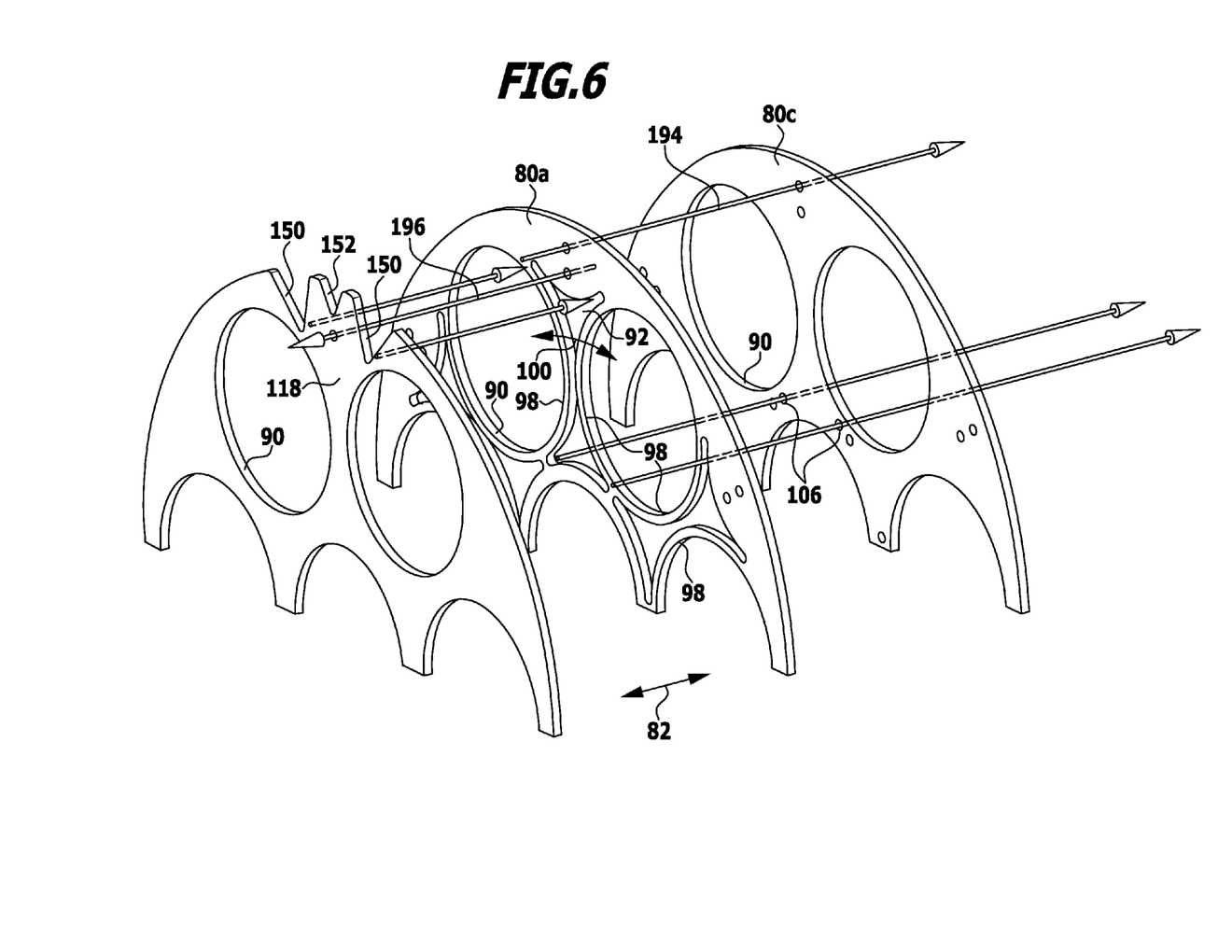
FIG. 6 shows an illustration of the segments similar to FIG. 5 in the region of inlet openings of a first channel subsystem.
Figure 7:
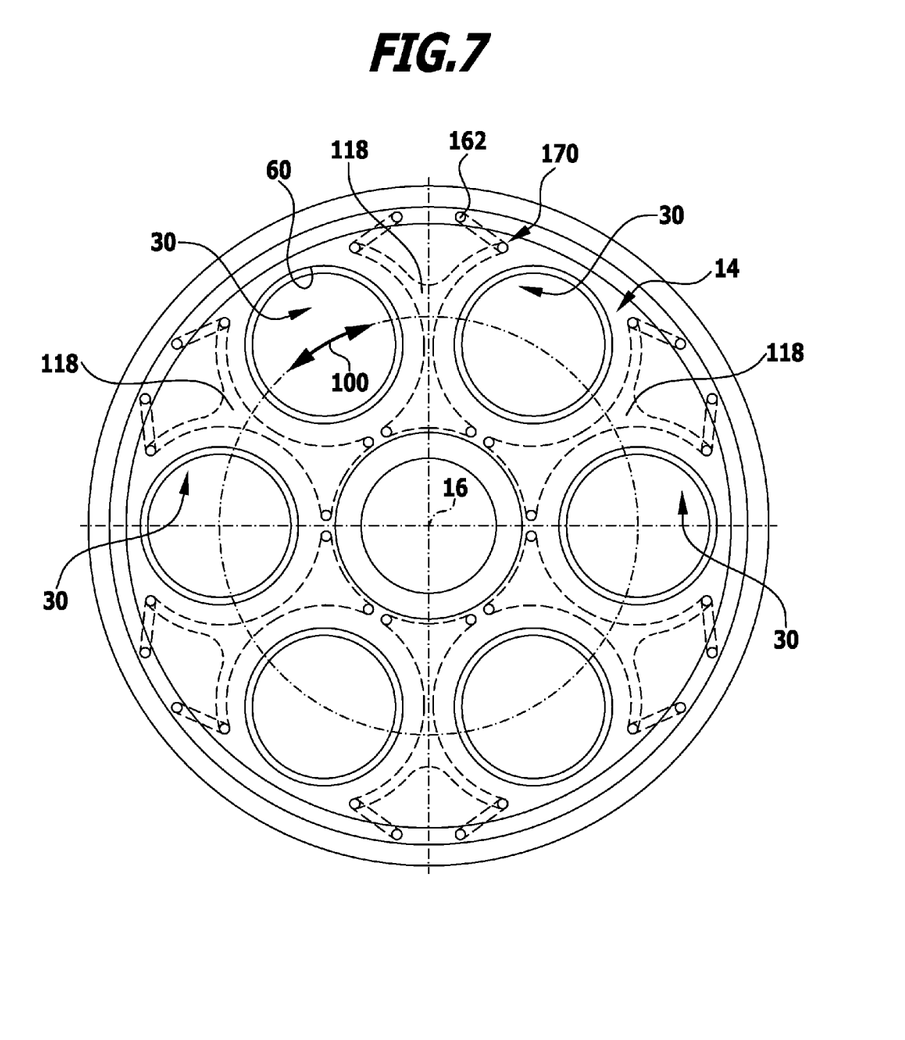
FIG. 7 shows a section along line 7-7 in FIG. 3.

For this purpose, as illustrated in FIGS. 1 to 3, an annular space 140 is provided which surrounds the spindle drum 14 on its outer side and has an annular space cover 142 engaging over it which is arranged stationarily in the machine frame 12 and adjoins sealingly on cylinder surfaces 144 and 146 of the spindle drum 14 on both sides of the annular space 140 so that liquid cooling medium supplied to the annular space 140 remains in the annular space 140 and from this annular space can enter the first channel subsystem 120 and the second channel subsystem 130, respectively, via entry openings 124 and 134 (FIG. 3), formed by entry cutouts 150 provided in special segments 80d (FIG. 6).

Proceeding from the entry cutouts 150 in the segments 80d, the liquid cooling medium then has the possibility of entering the areas 94 of the cooling cutouts 92 in the next following segments 80a which are located radially outwards.

Furthermore, the channel subsystems 120 and 130 are also provided at their ends with exit openings 126 and 136 which likewise open into an annular space 170 which surrounds the spindle drum 14 on its casing side and via which the liquid cooling medium entering this annular space 170 can run off the casing side of the spindle drum 14 in line with gravity, namely as far as a collecting receptacle 172, from which the cooling medium will be taken up by a cooling medium pump.

As illustrated in FIG. 3, a third channel subsystem 180 is provided in addition for the spindle bearing receptacle 50 and this is located in an area 182 in the intermediate space 118 between the bearing receptacles 50 for separately cooling the spindle drum and has an entry opening 184 for cooling medium supplied to the annular space 140, which is located between the entry openings 124 and is likewise formed by an entry cutout 152 in the segment 80d, as well as an outlet 186 which faces the annular space 170 for discharging the cooling medium into the annular space 170.

The third channel subsystem 180 is likewise formed by cooling cutouts 192 and 194 in segments 80e and 80f which are arranged in the area 182 of the intermediate space 118 and also comprises entry channels 194 which lead from the entry openings 184 to the area 182 as well as exit channels 196 which lead from the area 182 to the exit openings 186.

In order to coordinate the cooling of the spindle drum 14 by the channel subsystems 120, 130 and 180 such that the spindle drum 14 has in all the areas 122, 132, 182 cooled by the channel subsystems 120, 130 and 180 an essentially constant temperature which is essentially identical in all the areas 122, 132, 182 which the channel subsystems 120, 130 and 180 pass through, the exit openings 126 of the channel subsystem 120 and the exit openings 186 of the channel subsystem 180 are provided with throttle elements 202 and 204, respectively, which allow adjustment of the liquid cooling medium flowing out of the channel subsystem 120 and 180, respectively, into the annular space 170 for adjusting the respective temperature.

Figure 8:
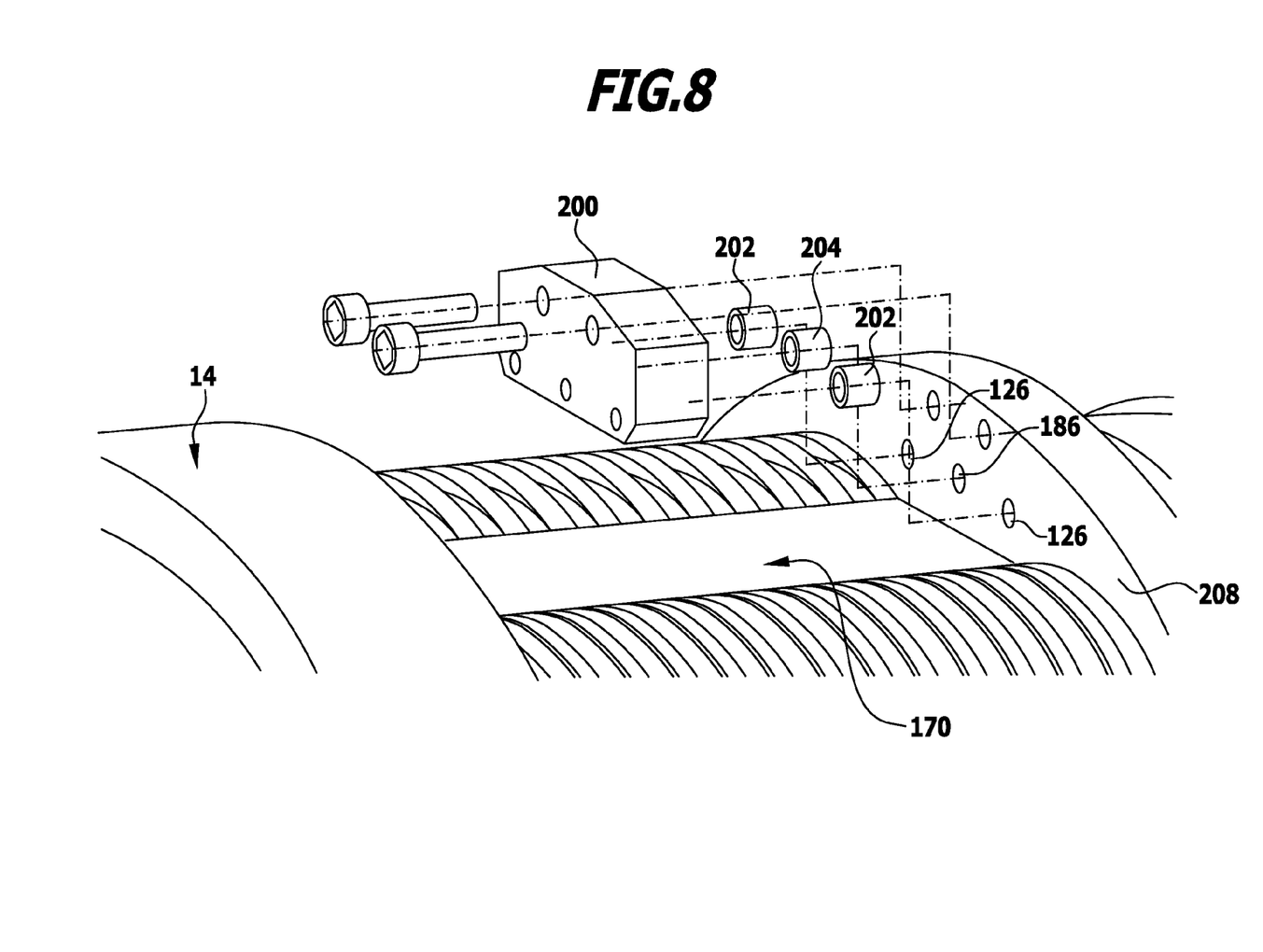
FIG. 8 shows a sectional, enlarged, perspective exploded illustration of throttle elements in the region of outlet openings of the first channel subsystem and the third channel subsystem.

The throttle elements 202 and 204 are preferably arranged in a receiving block 200 which can be screwed onto a flange 208 of the spindle drum 14 which includes the openings 126 and 186, namely such that the throttle elements 202 and 204 are seated directly in front of the openings 126 and 186, respectively, and throttle the flow rate of the exiting cooling medium.

The invention claimed is:

1. Multispindle lathe comprising
a machine frame,
a spindle drum arranged in the machine frame and rotatable about a spindle drum axis, said spindle drum being made up at least partially of segments cut out from flat material in a stacking direction parallel to the spindle drum axis and extending in stacking planes transverse to the stacking direction, said segments having receiving cutouts and cooling channel cutouts overlapping with one another such that the spindle drum has spindle motor receptacles for spindle motors and a cooling channel system separated therefrom by wall webs,
the cooling channel system having several channel subsystems for a liquid cooling medium, said channel subsystems being arranged individually and independently of one another.

2. Multispindle lathe as defined in claim 1, wherein the channel subsystems cool different sections of the spindle motor receptacle following one another in the direction of the spindle drum axis.

3. Multispindle lathe as defined in claim 1, wherein the several channel subsystems are arranged to the side of the spindle motor and follow one another in the direction of the spindle drum axis.

4. Multispindle lathe as defined in claim 3, wherein a channel subsystem of the several channel subsystems is arranged in each of a respective area of the spindle drum.

5. Multispindle lathe as defined in claim 1, wherein the channel subsystems are arranged in intermediate spaces between spindle motor receptacles arranged so as to follow one another in a circumferential direction around the spindle drum axis.

6. Multispindle lathe as defined in claim 5, wherein several channel subsystems are arranged in each intermediate space between two spindle motor receptacles so as to follow one another in the direction of the spindle drum axis.

7. Multispindle lathe comprising:
a machine frame;
a spindle drum arranged in the machine frame and rotatable about a spindle drum axis, said spindle drum being made up at least partially of segments cut out from flat material in a stacking direction parallel to the spindle drum axis and extending in stacking planes transverse to the stacking direction, said segments having receiving cutouts and cooling channel cutouts overlapping with one another such that the spindle drum has spindle motor receptacles for spindle motors and a cooling channel system separated therefrom by wall webs;
the cooling channel system having several channel subsystems for a liquid cooling medium, said channel subsystems being arranged individually and independently of one another; and
wherein the channel subsystems are fed with liquid cooling medium through a common annular space surrounding the spindle drum.

8. Multispindle lathe as defined in claim 7, wherein a stationary annular space cover engages over the annular space and sealingly adjoins the spindle drum on both sides thereof.

9. Multispindle lathe comprising:
a machine frame;
a spindle drum arranged in the machine frame and rotatable about a spindle drum axis, said spindle drum being made up at least partially of segments cut out from flat material in a stacking direction parallel to the spindle drum axis and extending in stacking planes transverse to the stacking direction, said segments having receiving cutouts and cooling channel cutouts overlapping with one another such that the spindle drum has spindle motor receptacles for spindle motors and a cooling channel system separated therefrom by wall webs;

the cooling channel system having several channel subsystems for a liquid cooling medium, said channel subsystems being arranged individually and independently of one another; and wherein the channel subsystems discharge the liquid cooling medium into an annular space surrounding the spindle drum.

10. Multispindle lathe as defined in claim 9, wherein the annular space merges into a receptacle for the cooling medium.

11. Multispindle lathe as defined in claim 1, wherein a flow of cooling medium through different channel subsystems is adapted to be coordinated by throttle elements.

12. Multispindle lathe as defined in claim 11, wherein the throttle elements are associated with exit openings of the channel subsystems.

13. Multispindle lathe as defined in claim 1, wherein the stator body is designed as a stack of metal sheets and wherein the stack of metal sheets of the stator abuts directly on an inner wall of the stator receptacle of the spindle motor receptacle.

* * * * *